(12) United States Patent
Shinada

(10) Patent No.: US 9,702,623 B2
(45) Date of Patent: Jul. 11, 2017

(54) DRYING DEVICE FOR HOLLOW FIBER MEMBRANE

(75) Inventor: Katsuhiko Shinada, Aichi (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days.

(21) Appl. No.: 14/113,816

(22) PCT Filed: Apr. 25, 2012

(86) PCT No.: PCT/JP2012/061148
§ 371 (c)(1),
(2), (4) Date: Oct. 25, 2013

(87) PCT Pub. No.: WO2012/147821
PCT Pub. Date: Nov. 1, 2012

(65) Prior Publication Data
US 2014/0047728 A1 Feb. 20, 2014

(30) Foreign Application Priority Data
Apr. 26, 2011 (JP) ................................. 2011-098201

(51) Int. Cl.
*F26B 13/06* (2006.01)
*F26B 13/08* (2006.01)
(Continued)

(52) U.S. Cl.
CPC .......... *F26B 13/10* (2013.01); *B01D 67/0095* (2013.01); *B01D 69/087* (2013.01);
(Continued)

(58) Field of Classification Search
CPC .... B01D 69/08; B01D 69/087; B01D 69/081; B01D 69/082; B65H 59/05;
(Continued)

(56) References Cited

U.S. PATENT DOCUMENTS 2,109,469 A * 3/1938 Cohn ....................... D06C 5/00
26/72
2,265,313 A * 12/1941 Ridley ............................ 34/203
(Continued)

FOREIGN PATENT DOCUMENTS

CN 1130543 9/1996
JP 07-313854 12/1995
(Continued)

OTHER PUBLICATIONS

"International Search Report (Form PCT/ISA/210)", mailed on Jul. 31, 2012, with English translation thereof, p. 1-p. 3, in which the listed references (JP2006-231276, JP07-313854, WO2009/142279) were cited.

(Continued)

*Primary Examiner* — Kenneth Rinehart
*Assistant Examiner* — John McCormack
(74) *Attorney, Agent, or Firm* — Jianq Chyun IP Office

(57) ABSTRACT

The purpose of the present invention is to provide a drying device capable of preventing entanglement of a hollow fiber membrane in a drying chamber and preventing diameter reduction and flattening of the hollow fiber membrane. This drying device includes the drying chamber having a heating means disposed therein, a guide roll that causes at least two hollow fiber membranes (A) to travel inside the drying chamber, and at least two winding bobbins disposed outside the drying chamber. The drying device simultaneously dries at least two hollow fiber membranes (A) in the drying chamber while winding one hollow fiber membrane (A) on one winding bobbin. A rotation speed control means is attached separately to each of the at least two winding bobbins.

12 Claims, 1 Drawing Sheet

(51) Int. Cl.
*F26B 19/00* (2006.01)
*F26B 13/10* (2006.01)
*B01D 67/00* (2006.01)
*B01D 69/08* (2006.01)
*F26B 13/12* (2006.01)
*F26B 13/00* (2006.01)

(52) U.S. Cl.
CPC .............. *F26B 13/08* (2013.01); *F26B 13/12* (2013.01); *B01D 2323/42* (2013.01); *F26B 13/001* (2013.01)

(58) Field of Classification Search
CPC ............ B65H 59/00538; B65H 59/384; B65H 59/385; D01D 10/06; D01D 10/04; D01D 10/0409; B29C 35/025; B29C 35/045; B29C 35/06; B29C 35/065; B29C 47/0014; B29C 47/0023; B29C 47/88; B29C 47/8805; B29C 47/881; B29C 47/901
USPC ......... 34/620, 648–650, 203, 236, 218, 201, 34/657, 647; 242/412, 413, 334; 264/211.12, 211.14, 211.15, 211.17, 632, 264/634, 635, 637, 638, 639, 172.1; 210/500.23
See application file for complete search history.

(56) References Cited

U.S. PATENT DOCUMENTS

| | | | | |
|---|---|---|---|---|
| 2,453,332 A * | 11/1948 | Millhiser | | 8/149.1 |
| 3,341,949 A * | 9/1967 | Flaith | | F26B 17/04 34/218 |
| 3,554,502 A * | 1/1971 | Rye et al. | | 427/542 |
| 3,643,340 A * | 2/1972 | Jackson | | F26B 21/007 34/403 |
| 3,687,607 A * | 8/1972 | Yazawa | | 8/149.1 |
| 3,911,657 A * | 10/1975 | Bell | | D01H 15/013 242/473.6 |
| 4,611,410 A * | 9/1986 | Brossmer | | D02J 13/00 28/172.1 |
| 4,821,427 A * | 4/1989 | Chern | | F26B 25/22 34/124 |
| 5,072,889 A * | 12/1991 | Brouwer | | B65H 54/20 242/486.7 |
| 5,908,290 A * | 6/1999 | Kawamura | | D01F 9/32 34/636 |
| 6,006,060 A * | 12/1999 | Sato | | 399/284 |
| 2001/0020433 A1* | 9/2001 | Burton et al. | | 112/470.05 |
| 2008/0206455 A1* | 8/2008 | Sonobe et al. | | 427/162 |
| 2009/0075050 A1* | 3/2009 | Adzima et al. | | 428/292.1 |
| 2009/0229334 A1* | 9/2009 | Hashizume et al. | | 72/289 |
| 2009/0241365 A1* | 10/2009 | Taguchi et al. | | 34/389 |
| 2013/0168007 A1* | 7/2013 | Cote | | B01D 69/08 156/85 |

FOREIGN PATENT DOCUMENTS

| | | |
|---|---|---|
| JP | 2006-231276 | 9/2006 |
| WO | 2009/142279 | 11/2009 |

OTHER PUBLICATIONS

"Office Action of China Counterpart Application", issued on Mar. 18, 2015, with English translation thereof, pp. 1-pp. 13, in which the listed reference was cited.

* cited by examiner

DRYING DEVICE FOR HOLLOW FIBER MEMBRANE

CROSS-REFERENCE TO RELATED APPLICATION

This application is a 371 application of an international PCT application serial no. PCT/JP2012/061148, filed on Apr. 25, 2012, which claims the priority benefit of Japan application no. 2011-098201, filed on Apr. 26, 2011. The entirety of each of the above-mentioned patent applications is hereby incorporated by reference herein and made a part of this specification.

FIELD OF THE INVENTION

The present invention relates to a drying device for drying a hollow fiber membrane.

DESCRIPTION OF RELATED ART

Due to the growing awareness of environment pollution and stricter regulations, a water treatment method utilizing a filtration membrane that is excellent in properties such as completeness of separation and compactness has become the focus of attention in recent years.

A non-solvent phase separation method, which utilizes a non-solvent phase separation phenomenon that causes phase separation and porousness of a polymer solution with a non-solvent, is known as a method for producing hollow fiber membranes. It is known that the non-solvent phase separation method includes wet and dry-wet spinning methods (which are referred to as "wet spinning" collectively hereinafter).

When producing hollow fiber membranes by wet spinning, a membrane-forming raw solution, which contains a hydrophobic polymer, a hydrophilic polymer, and a solvent, is discharged in an annular shape from a spinning nozzle to be coagulated in a coagulation liquid in a coagulation process, so as to form hollow fiber membranes.

A large amount of the hydrophilic polymer in a solution state and the solvent may remain in the hollow fiber membranes formed by the coagulation process. If there is an excessive amount of the hydrophilic polymer remaining in the hollow fiber membranes, the water permeability is impaired. However, if the hydrophilic polymer dries in the hollow fiber membranes, the mechanical strength of the membranes may be lowered. For these reasons, after the coagulation process, the hydrophilic polymer remaining in the hollow fiber membranes is usually immersed in a chemical solution containing an oxidant such as hypochlorous acid, and then decomposed by heating, removed by washing, and dried.

A drying device used in the aforementioned drying process, for example, includes a drying chamber provided with a heating means, guide rolls that cause a plurality of hollow fiber membranes to travel inside the drying chamber, and a plurality of winding bobbins disposed outside the drying chamber, so as to dry the hollow fiber membranes simultaneously in the drying chamber (Patent Literature 1). The rotation speed of the winding bobbins is controlled by a common rotation speed control means, and one hollow fiber membrane is wound onto one winding bobbin.

PRIOR ART LITERATURE

Patent Literature

Patent Literature 1: Japanese Patent Publication No. 2006-231276

SUMMARY OF THE INVENTION

Problem to be Solved

However, when using the drying device disclosed in Patent Literature 1, problems, such as entanglement of the hollow fiber membranes in the drying chamber or diameter reduction and flattening of the hollow fiber membranes, may occur.

The present invention is provided in order to prevent entanglement of the hollow fiber membranes in the drying chamber and diameter reduction and flattening of the hollow fiber membranes.

Solution to the Problem

The present invention has the following embodiments.

[1] A drying device for hollow fiber membranes includes a drying chamber having an inlet, an outlet, and a heating element for the hollow fiber membranes, at least two guide rolls causing at least two hollow fiber membranes to travel inside the drying chamber, and at least two winding bobbins disposed outside the drying chamber, wherein a rotation speed control element is attached separately to each of the at least two winding bobbins.

[2] In the drying device of [1], a plurality of first drive assist rolls that are independent of each other and corresponding to the respective hollow fiber membranes in number are disposed further on a downstream side of the inlet for the hollow fiber membranes with respect to a traveling direction of the hollow fiber membranes.

[3] In the drying device of [2], a plurality of second drive assist rolls that are independent of each other and corresponding to the respective hollow fiber membranes in number are disposed further on an upstream side of the outlet for the hollow fiber membranes with respect to the traveling direction of the hollow fiber membranes.

[4] In the drying device of [1], the guide rolls are free guide rolls.

[5] In the drying device of [4], the guide rolls are arranged to cause the hollow fiber membranes to travel in a horizontal direction.

[6] In the drying device of [5], the guide rolls are arranged so that the hollow fiber membranes reciprocate 1 to 20 times in the drying chamber.

[7] In the drying device of any one of [1]-[6], the heating element further includes a circulation element that circulates a gas, and the circulation element has a gas inlet port and a gas outlet port, which are arranged to blow the gas to the hollow fiber membranes traveling in the drying chamber.

[8] In the drying device of [7], the gas inlet port is disposed at an upper portion inside the drying chamber and the gas outlet port is disposed at a lower portion inside the drying chamber for the heating element to blow the gas to the hollow fiber membranes traveling vertically from the upper portion to the lower portion.

[9] In the drying device of [8], the guide rolls are arranged so that the hollow fiber membranes reciprocate and travel from the lower portion to the upper portion while traveling horizontally.

[10] In the drying device of [9], a wind speed of the gas is 30 m/sec or more and 130 m/sec or less.

[11] In the drying device of [10], a traveling distance in the drying chamber is in a range of 6 m or more and 120 m or less.

[12] In the drying device of [1], the guide rolls comprising free guide rolls each having a diameter of 60 mm or more and 300 mm or less.

[13] In the drying device of [1] or [2], at least peripheral surfaces of the guide rolls comprise a fluorine resin.

[14] The drying device of any one of [2]-[13] further includes a pressure-reducing element that reduces a pressure around a traveling path of the hollow fiber membranes on an upstream side of the second drive assist rolls.

[15] In the drying device of [2] or [3], a driving force of the first drive assist rolls is adjusted so that a tension of the hollow fiber membranes that travel in the drying chamber is in a range of 500 cN to 700 cN.

[16] In the drying device of [15], the driving force of the first drive assist rolls and a driving force of the second drive assist rolls are adjusted in conjunction with each other so that the tension of the hollow fiber membranes that travel in the drying chamber is in a range of 500 cN to 700 cN.

Effects of the Invention

The drying device of the present invention is capable of preventing entanglement of the hollow fiber membranes in the drying chamber and diameter reduction and flattening of the hollow fiber membranes.

In the drying device of the present invention, diameter reduction and flattening of the hollow fiber membranes can be further prevented when the guide rolls comprise free guide rolls each having a diameter of 60 mm or more and 300 mm or less.

In addition, exfoliation of surfaces of the hollow fiber membranes can be avoided when at least the peripheral surfaces of the guide rolls comprise a fluorine resin.

According to the embodiment of [1], entanglement of the hollow fiber membranes in the drying chamber and diameter reduction and flattening of the hollow fiber membranes can be prevented.

According to the embodiment of [2], the hollow fiber membranes can be prevented from slipping on the drive rolls, and furthermore, entanglement of the hollow fiber membranes in the drying chamber and diameter reduction and flattening of the hollow fiber membranes can be avoided.

According to the embodiment of [3], bobbin winding can be carried out and entanglement of the hollow fiber membranes in the drying chamber and diameter reduction and flattening of the hollow fiber membranes can be avoided.

According to the embodiment of [4], power consumption can be reduced.

According to the embodiment of [5], the hollow fiber membranes traveling more efficiently in a height direction can be disposed.

According to the embodiment of [6], required amount of traveling time can be ensured according to fiber properties and traveling speed, etc.

According to the embodiment of [7], high-speed drying can be achieved.

According to the embodiment of [8], drying can be performed with high efficiency.

According to the embodiment of [9], drying can be performed more efficiently.

According to the embodiment of [10], drying can be performed with high efficiency.

According to the embodiment of [11], required amount of traveling time can be ensured according to fiber properties and traveling speed, etc.

According to the embodiment of [12], diameter reduction and flattening of the hollow fiber membranes can be avoided.

According to the embodiment of [13], exfoliation of surfaces of the hollow fiber membranes can be avoided.

According to the embodiment of [14], by making the hollow fiber membranes travel by the pressure-reducing element that reduces a pressure around the traveling path of the hollow fiber membranes, moisture attached to the hollow fiber membranes due to washing can be reduced.

According to the embodiment of [15], the winding can be carried out stably. Moreover, entanglement of the hollow fiber membranes in the drying chamber and diameter reduction and flattening of the hollow fiber membranes due to excessive tension can be avoided.

DESCRIPTION OF THE EMBODIMENTS

A drying device, adapted for drying a hollow fiber membrane, of the present invention includes: a drying chamber having an inlet, an outlet, and a heating element for the hollow fiber membrane; at least two guide rolls causing at least two hollow fiber membranes to travel inside the drying chamber; and at least two winding bobbins prepared outside the drying chamber, wherein a rotation speed control element is attached separately to each of the at least two winding bobbins.

An embodiment of the drying device of the present invention is described below.

Figure 1:
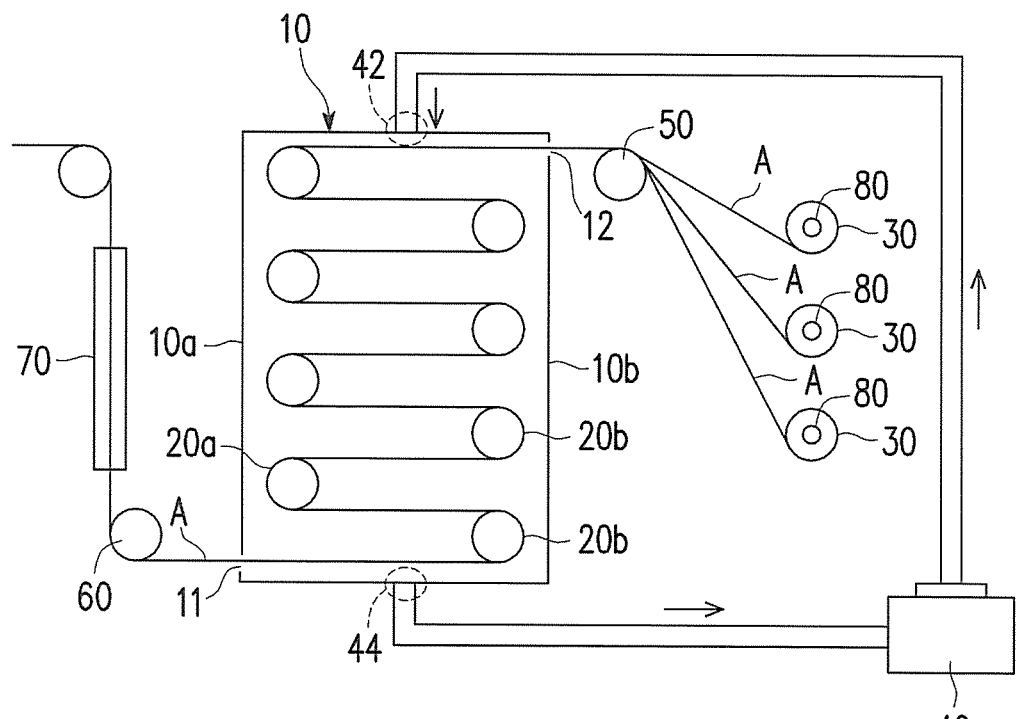
FIG. 1 is a schematic diagram illustrating an embodiment of a drying device, adapted for drying a hollow fiber membrane, of the present invention.

FIG. 1 is a schematic diagram of the drying device of this embodiment. The drying device of this embodiment includes a drying chamber 10, guide rolls (first guide roll 20a and second guide roll 20b), an inlet 11, an outlet 12, and at least two winding bobbins 30.

(Drying Chamber)

The drying chamber 10 includes a heating element 40 for heating the inside of the drying chamber 10.

The drying chamber 10 of this embodiment is an approximately rectangular parallelepiped. The inlet 11 is formed at a lower portion of a side surface 10a of the drying chamber 10 for introducing hollow fiber membranes A into the drying chamber 10. The outlet 12 is formed at an upper portion of a side surface 10b, which is opposite to the side surface 10a, for leading the hollow fiber membranes A outside.

In addition, it is preferable to dispose first drive assist rolls 50 that are independent of each other and corresponding to the respective hollow fiber membranes in number on a downstream side of the inlet 11 of the hollow fiber membranes with respect to a traveling direction of the hollow fiber membranes. By disposing the first drive assist rolls 50 as mentioned above, the hollow fiber membranes can be prevented from slipping on drive rolls, and furthermore, entanglement of the hollow fiber membranes in the drying chamber and diameter reduction and flattening of the hollow fiber membranes can be avoided. The drive assist roll refers to a device having a roll that controls tension of each spindle individually while driving. The drive roll refers to a roll that has a drive unit, such as a motor.

Moreover, it is preferable to dispose second drive assist rolls 60 that are independent of each other and corresponding to the respective hollow fiber membranes in number on an upstream side of the outlet 12 of the hollow fiber membranes with respect to the traveling direction of the hollow fiber membranes. By disposing the second drive assist rolls 60 as mentioned above, it is possible to carry out bobbin winding, and entanglement of the hollow fiber membranes in the drying chamber and diameter reduction and flattening of the hollow fiber membranes can be avoided.

In addition, it is preferable to adjust a driving force of the first drive assist rolls 50 so that the tension of the hollow fiber membranes that travel in the drying chamber falls in a range of 500 cN to 700 cN. More preferably, the driving force of the first drive assist rolls 50 and a driving force of the second drive assist rolls 60 are adjusted in conjunction with each other. By adjusting the tension to the aforementioned range, the hollow fiber membranes can be wound stably. Further, entanglement of the hollow fiber membranes in the drying chamber and diameter reduction and flattening of the hollow fiber membranes due to excessive tension can be avoided.

The heating element 40 may be a hot air supply means, an infrared lamp, or the like, for example.

Preferably, the heating element 40 includes a circulation element for circulating a gas, wherein the circulation element has a gas inlet port 42 and a gas outlet port 44, which are arranged to blow the gas to the hollow fiber membranes traveling in the drying chamber. Regarding the heating element 40, it is preferable to dispose the gas inlet port 42 at an upper portion inside the drying chamber and dispose the gas outlet port 44 at a lower portion inside the drying chamber so as to blow the gas to the hollow fiber membranes traveling vertically from the upper portion to the lower portion. With the heating element 40 as described above, the hollow fiber membranes can be dried with high efficiency. Furthermore, a wind speed of the aforementioned gas is preferably 30 m/sec or more and 130 m/sec or less, and more preferably 50 m/sec or more and 100 m/sec or less. By setting the wind speed as mentioned above, the hollow fiber membranes can be dried with high efficiency. If the wind speed of the gas is below 30 m/sec, problems such as poor drying efficiency may occur, and if the wind speed exceeds 130 m/sec, the hollow fiber membranes may come off from the guide rolls due to shaking.

A pressure-reducing element 70, which has a cylindrical body with both ends open, is disposed on an upstream side of the drying chamber. The pressure-reducing element 70 reduces a pressure around a traveling path of the hollow fiber membranes on the upstream side of the drying chamber. The cylindrical body serves as the traveling path of the hollow fiber membranes and a pressure-reducing pump or the like is used for suction inside the cylindrical body to reduce the pressure around the traveling path of the hollow fiber membranes. By reducing the pressure around the traveling path of the hollow fiber membranes, moisture attached to the hollow fiber membranes due to washing can be reduced to improve the drying efficiency.

In addition, the pressure-reducing element 70 is disposed on the upstream side of the second drive assist rolls 60.

(Guide Roll)

In this embodiment, the first guide rolls 20a and the second guide rolls 20b cause each hollow fiber membrane A to travel in a horizontal direction inside the drying chamber 10. At least two first guide rolls 20a are disposed on the side of the side surface 10a of the drying chamber 10. The first guide rolls 20a are arranged parallel to each other and horizontally. Moreover, at least two first guide rolls 20a are disposed at equal distances from the side surface 10a. At least two second guide rolls 20b are disposed on the side of the side surface 10b, and the second guide rolls 20b are arranged parallel to each other and horizontally. In addition, at least two second guide rolls 20b are disposed at equal distances from the side surface 10b.

Besides, the first guide rolls 20a and the second guide rolls 20b are respectively disposed at different heights. More specifically, the one disposed at the bottom is the second guide roll 20b, above which the first guide rolls 20a and the other second guide rolls 20b are alternately arranged to be higher than one another, and the one disposed at the top is the first guide roll 20a. An interval between the first guide rolls 20a is approximately equal to a diameter of the second guide roll 20b, and an interval between the second guide rolls 20b is approximately equal to a diameter of the first guide roll 20a. In terms of the first guide rolls, the interval therebetween refers to a distance from an outmost portion of an outer peripheral surface of one first guide roll to an outmost portion of an outer peripheral surface of another first guide roll adjacent thereto, which also applies to the second guide rolls.

Figure 2:
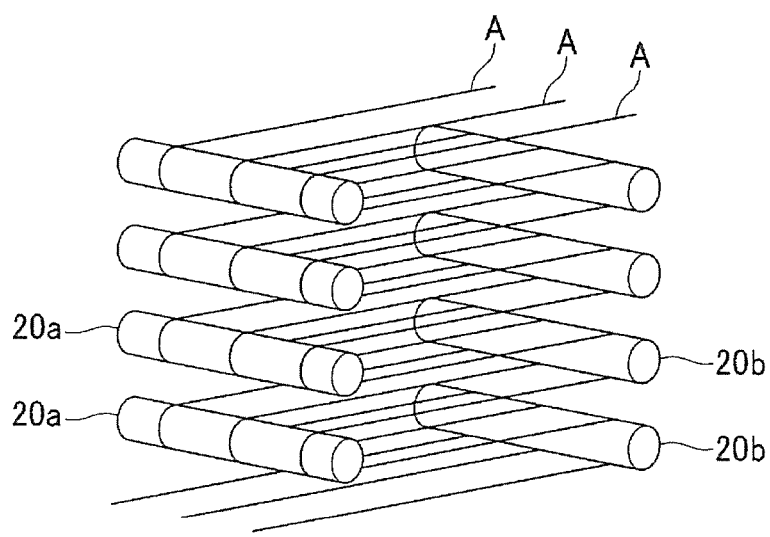
FIG. 2 is a schematic diagram illustrating a transport mode of the hollow fiber membrane in the drying device of FIG. 1.

As shown in FIG. 2, the hollow fiber membranes A are wound on the first guide rolls 20a and the second guide rolls 20b alternately, so that a transport direction of the hollow fiber membranes A is in the horizontal direction. While the transport direction of the hollow fiber membranes A reverses and reciprocates, the hollow fiber membranes A can be transported.

The guide rolls may be arranged to cause the hollow fiber membranes to travel in the horizontal direction. With such an arrangement, the hollow fiber membranes can travel more efficiently in a height direction.

Moreover, the guide rolls may be arranged to make the hollow fiber membranes reciprocate 1 to 20 times in the drying chamber. With such an arrangement, required amount of traveling time of the hollow fiber membranes can be ensured according to fiber properties and traveling speed, etc. In other words, since two guide rolls are required for each reciprocation, two to forty guide rolls may be disposed. The guide rolls may be arranged so that the hollow fiber membranes reciprocate and travel from the lower portion to the upper portion while traveling horizontally. With such an arrangement, the hollow fiber membranes can be dried more efficiently.

In addition, a traveling distance of the hollow fiber membranes in the drying chamber is preferably 6 m or more and 120 m or less. By setting the traveling distance to this range, required amount of traveling time can be ensured according to the fiber properties and the traveling speed, etc. The traveling distance also refers to a length of the hollow fiber membrane received in the drying chamber.

The first guide rolls 20a and the second guide rolls 20b are free guide rolls, and the diameter thereof is preferably 60 mm or more and 300 mm or less, and more preferably 90 mm or more and 100 mm or less. Here, the free guide roll refers to a roll that is not provided with a driving means, such as a motor, etc. Since the guide rolls are free guide rolls, power consumption can be reduced.

If the diameter of the first guide rolls 20a and the second guide rolls 20b is in the range of 60 mm or more and 300 mm or less, the tension applied to the hollow fiber membranes A wound on the first guide rolls 20a and the second guide rolls 20b can be suppressed, so as to prevent diameter reduction and flattening of the hollow fiber membranes A. If the diameter exceeds 300 mm, filling efficiency of the drying chamber decreases. Moreover, from the aspect of practicability, the diameter of the first guide rolls 20a and the second guide rolls 20b is preferably equal to or less than 100 mm. In addition, a variation of the tension between the hollow fiber membranes A is reduced in the case that the first guide rolls 20a and the second guide rolls 20b are free guide rolls.

Preferably, at least the peripheral surfaces of the first guide rolls 20a and the second guide rolls 20b comprise a fluorine resin. The hydrophilic polymer used in the production of the hollow fiber membranes A may remain and easily adhere to the first guide rolls 20a and the second guide rolls 20b. In the case that the peripheral surfaces of the first guide rolls 20a and the second guide rolls 20b comprise the fluorine resin, adhesion of the hollow fiber membranes A can be suppressed, and consequently exfoliation of surfaces of the hollow fiber membranes A can be avoided.

The fluorine resin used for forming the first guide rolls 20a and the second guide rolls 20b may be polytetrafluoroethylene, polyvinylidene fluoride, etc., for example.

(Winding Bobbin)

At least two winding bobbins 30 are disposed outside the drying chamber 10 on the side of the side surface 10b and are used to wind the hollow fiber membranes A that have been dried in the drying chamber 10. One hollow fiber membrane A is wound onto one winding bobbin 30.

Moreover, a rotation speed control element 80, such as a motor of variable rotation speed, is attached separately to each of the at least two winding bobbins 30. Thus, a rotation speed of the individual winding bobbin 30 is adjustable. Through adjustment of the rotation speed of the winding bobbin 30, the tension of the hollow fiber membranes A that are being wound can be adjusted. That is, the tension of the hollow fiber membranes A increases when the rotation speed of the winding bobbin 30 is raised, and the tension of the hollow fiber membranes A decreases when the rotation speed of the winding bobbin 30 is lowered.

(Drying Method for Hollow Fiber Membrane)

An example of a drying method utilizing the aforementioned drying device for drying a hollow fiber membrane is explained below.

In this example, the hollow fiber membrane to be transported in the drying device is obtained by: discharging from a spinning nozzle a membrane-forming raw solution, which contains a hydrophobic polymer, a hydrophilic polymer, and a solvent dissolving the hydrophobic polymer and the hydrophilic polymer, in an annular shape; coagulating the same with a coagulation liquid to form a porous film; washing the porous film as necessary; and performing an oxidative decomposition treatment for the hydrophilic polymer.

The membrane-forming raw solution may be discharged onto a peripheral surface of a hollow cord-like support body that is delivered from the spinning nozzle. A knitted cord or a braided cord can be used as the hollow cord-like support body. Fibers that make up the knitted cord or the braided cord may be synthetic fibers, semi-synthetic fibers, regenerated fibers, natural fibers, etc. Furthermore, a form of the fibers may be monofilament, multifilament, or spun yarn.

The hydrophobic polymer may be a polysulfone-based resin such as polysulfone or polyether sulfone, a fluorine resin such as polyvinylidene fluoride, polyacrylonitrile, cellulose derivative, polyamide, polyester, polymethacrylate, polyacrylate, etc. Moreover, the hydrophobic polymer may be a copolymer of the foregoing. One type of hydrophobic polymer may be used solely, or two or more types of hydrophobic polymers may be used in combination.

From the aspect of achieving excellent durability against an oxidant such as hypochlorous acid, fluorine resin is preferred among the aforementioned hydrophobic polymers, and polyvinylidene fluoride or a copolymer of polyvinylidene fluoride and other monomers is preferred.

The hydrophilic polymer is added for adjusting the viscosity of the membrane-forming raw solution to a range suitable for the formation of the hollow fiber membranes in order to stabilize the state of film formation. It is preferable to use polyethylene glycol or polyvinylpyrrolidone, etc., as the hydrophilic polymer, among which polyvinylpyrrolidone or a copolymer obtained by copolymerizing polyvinylpyrrolidone with other monomers is preferred from the aspects of control of the pore size of the hollow fiber membrane and strength of the hollow fiber membrane.

The solvent may be N, N-dimethylformamide, N, N-dimethylacetamide, dimethyl sulfoxide, N-methyl-2-pyrrolidone, N-methylmorpholine-N-oxide, etc. One or more of the foregoing may be used. Moreover, within a range that does not impair the solubility of the hydrophobic polymer and the hydrophilic polymer to the solvent, a poor solvent for the hydrophobic polymer or the hydrophilic polymer may be mixed for use.

According to the drying method of this example, first, the inside of the drying chamber 10 is heated to a predetermined drying temperature by the heating element 40.

Here, the drying temperature (temperature inside the drying chamber 10) is preferably 130° C. or less, and more preferably 120° C. or less. By keeping the drying temperature below the aforementioned upper limits, extension and diameter reduction of the hollow fiber membranes A can be further prevented.

In addition, from the aspect of shortening the drying time, the drying temperature is preferably 100° C. or more, and more preferably 110° C. or more. In other words, the drying temperature is preferably 100° C. or more and 130° C. or less, and more preferably 110° C. or more and 120° C. or less.

Then, at least two hollow fiber membranes A are introduced into the drying chamber 10 via the inlet 11 and wound on the second guide roll 20b at the bottom. Preferably, the first drive assist rolls 50 that are independent of each other and corresponding to the respective hollow fiber membranes in number are disposed on the downstream side of the inlet 11 for the hollow fiber membranes with respect to the traveling direction of the hollow fiber membranes, so as to assist the traveling of the hollow fiber membranes, thereby preventing the hollow fiber membranes from slipping on the drive rolls. Accordingly, entanglement of the hollow fiber membranes in the drying chamber and diameter reduction and flattening of the hollow fiber membranes can be prevented.

Next, as shown in FIG. 2, the hollow fiber membranes are alternately wound on the second guide rolls 20b and the first guide rolls 20a and reciprocate in the horizontal direction to be transported to higher positions gradually, thereby heating and drying at least two hollow fiber membranes A simultaneously in the drying chamber 10.

Preferably, the gas is blown vertically to the hollow fiber membranes traveling from the gas inlet port 42 in the upper portion of the inside of the drying chamber and is sucked via the gas outlet port 44 in the lower portion of the inside of the drying chamber, so as to dry the hollow fiber membranes efficiently.

After being hung on the first guide roll 20a at the top, the dried hollow fiber membranes A are led out of the drying chamber 10 via the outlet 12 and wound onto the winding bobbins 30.

Further, it is preferable to dispose the second drive assist rolls 60 that are independent of each other and corresponding to the respective hollow fiber membranes in number on the upstream side of the outlet 12 of the hollow fiber membranes with respect to the traveling direction of the hollow fiber membranes, so as to assist the traveling of the hollow fiber membranes for winding the hollow fiber membranes onto the winding bobbins. Accordingly, entanglement of the hollow fiber membranes in the drying chamber and diameter reduction and flattening of the hollow fiber membranes can be avoided. Moreover, the driving forces of the first drive assist rolls 50 and the second drive assist rolls 60 may be adjusted so that the tension of the hollow fiber membranes that travel in the drying chamber is in the range of 500 cN to 700 cN, so as to wind the hollow fiber membranes stably and further to prevent diameter reduction and flattening of the hollow fiber membranes caused by excessive tension.

In this case, one hollow fiber membrane A is wound onto one winding bobbin 30. The tension applied to each of the hollow fiber membranes A is monitored during the winding. If the tension is too high and causes excessive extension, the rotation speed control element 80 attached to the winding bobbin 30 is used to lower the rotation speed of the winding bobbin 30, so as to reduce the tension of the hollow fiber membrane A. On the other hand, if the tension is too low and causes looseness, the rotation speed of the winding bobbin 30 is raised by the rotation speed control element 80 to increase the tension of the hollow fiber membrane A.

According to the above, the hollow fiber membranes A are wound onto the winding bobbins 30 so as to obtain winding bodies of the hollow fiber membranes A.

(Effects)

In the aforementioned embodiments, the rotation speed control element 80 is separately attached to each of the winding bobbins 30. Thus, the rotation speeds of the winding bobbins 30 can be adjusted to separately adjust the tension for each of the hollow fiber membranes A. Accordingly, the tension can be adjusted according to the state of each hollow fiber membrane A to prevent entanglement of the hollow fiber membranes A and diameter reduction and flattening of the hollow fiber membranes A. More specifically, the tension is raised for loose hollow fiber membranes A to prevent contact and entanglement of the hollow fiber membranes A that result from looseness. In addition, the tension is lowered for excessively extended hollow fiber membranes A to prevent diameter reduction and flattening of the hollow fiber membranes A caused by excessive extension.

Other Embodiments

The present invention is not limited to the aforementioned embodiments.

For example, the hollow fiber membranes may also be transported in a reverse traveling direction in the drying chamber, so as to make the hollow fiber membranes reciprocate in a vertical direction.

Moreover, the inlet and outlet of the drying chamber may be formed at any position of the side surfaces.

INDUSTRIAL APPLICABILITY

The drying device of the present invention is capable of preventing entanglement of the hollow fiber membranes in the drying chamber and diameter reduction and flattening of the hollow fiber membranes and is capable of achieving good efficiency in drying the hollow fiber membranes.

DESCRIPTIONS OF REFERENCE NUMERALS 10 drying chamber
10a, 10b side surface
11 inlet
12 outlet
20a first guide roll
20b second guide roll
30 winding bobbin

What is claimed is:

1. A drying device for hollow fiber membranes, comprising a drying chamber which comprises an inlet, an outlet, and a heating element for the hollow fiber membranes, at least two guide rolls located within the drying chamber causing at least two hollow fiber membranes to travel inside the drying chamber, and at least two winding bobbins disposed outside the drying chamber, wherein the drying chamber has only one inlet and one outlet for the hollow fiber membranes, and
  wherein the heating element comprises a hot air supply means or an infrared lamp, and the heating element further comprises a circulation element that circulates a gas, and the circulation element comprises a blower with a gas inlet port and a gas outlet port, which are arranged to blow the gas to the hollow fiber membranes traveling in the drying chamber, and the gas inlet port is disposed at an upper portion and the gas outlet port is disposed at a lower portion inside the drying chamber for the heating element to blow the gas to the hollow fiber membranes traveling vertically from the upper portion to the lower portion,
  wherein the guide rolls comprise free guide rolls each having a diameter of 60 mm to 300 mm, and the guide rolls are arranged so that the hollow fiber membranes reciprocate and travel from the lower portion inside the drying chamber to the upper portion inside the drying chamber while traveling horizontally, and
  wherein a rotation speed control element is attached separately to each of the at least two winding bobbins, and the rotation speed control element comprises a motor of variable rotation speed.

2. The drying device according to claim 1, wherein a plurality of first drive assist rolls that are independent of each other and corresponding to the respective hollow fiber membranes in number are disposed further on a downstream side of the inlet for the hollow fiber membranes with respect to a traveling direction of the hollow fiber membranes.

3. The drying device according to claim 2, wherein a plurality of second drive assist rolls that are independent of each other and corresponding to the respective hollow fiber membranes in number are disposed further on an upstream side of the outlet for the hollow fiber membranes with respect to the traveling direction of the hollow fiber membranes.

4. The drying device according to claim 1, wherein the guide rolls are arranged to cause the hollow fiber membranes to travel in a horizontal direction.

5. The drying device according to claim 4, wherein the guide rolls are arranged so that the hollow fiber membranes reciprocate 1 to 20 times in the drying chamber.

6. The drying device according to claim 1, wherein a wind speed of the gas is 30 m/sec or more and 130 m/sec or less.

7. The drying device according to claim 6, wherein a traveling distance in the drying chamber is in a range of 6 m or more and 120 m or less.

8. The drying device according to claim 1, wherein at least peripheral surfaces of the guide rolls comprise a fluorine resin.

9. The drying device according to claim 2, further comprising a pressure-reducing element that reduces a pressure around a traveling path of the hollow fiber membranes on an upstream side of the second drive assist rolls, wherein the pressure-reducing element comprises a cylindrical body with both ends open with a pressure-reducing pump.

10. The drying device according to claim 2, wherein a driving force of the first drive assist rolls is adjusted so that a tension of the hollow fiber membranes that travel in the drying chamber is in a range of 500 cN to 700 cN.

11. The drying device according to claim 3, wherein a driving force of the first drive assist rolls is adjusted so that a tension of the hollow fiber membranes that travel in the drying chamber is in a range of 500 cN to 700 cN.

12. The drying device according to claim 11, wherein the driving force of the first drive assist rolls and a driving force of the second drive assist rolls are adjusted in conjunction with each other so that the tension of the hollow fiber membranes that travel in the drying chamber is in a range of 500 cN to 700 cN.

* * * * *